Jan. 25, 1938.  W. J. WOOLLEY  2,106,512
AIR VENT
Filed Oct. 10, 1934
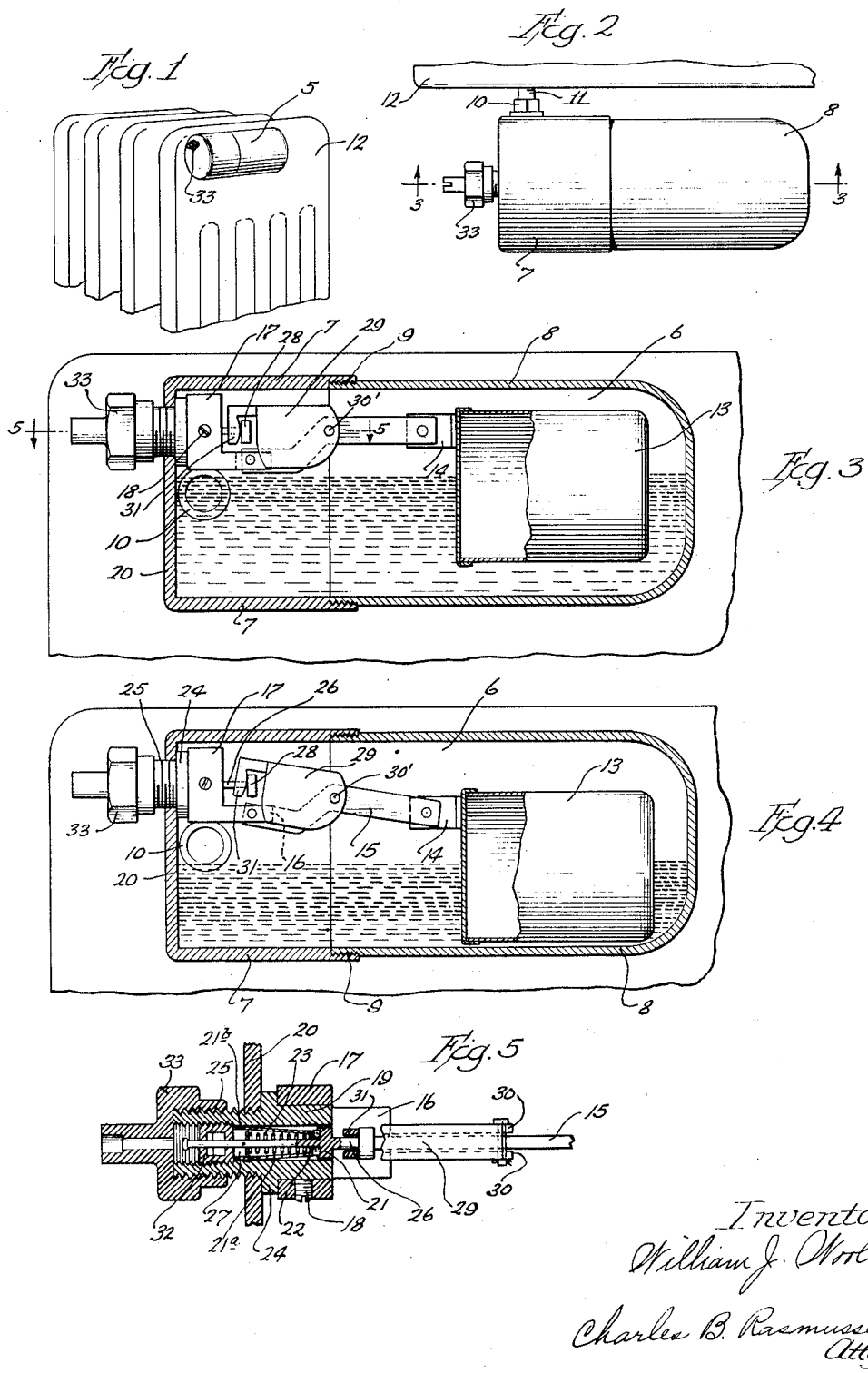
Inventor:
William J. Woolley
Charles B. Rasmussen
Atty.

Patented Jan. 25, 1938

2,106,512

UNITED STATES PATENT OFFICE 2,106,512

AIR VENT

William J. Woolley, Chicago, Ill.

Application October 10, 1934, Serial No. 747,736

3 Claims. (Cl. 137—122)

This invention relates to improvements in air relief devices particularly adapted for the radiators of hot water heating systems.

A principal object of the invention is the provision of an air relief valve, which is entirely automatic in operation, to permit the escape of air from a radiator as soon as a certain amount of air, which tends to impede or even stop the water circulation, has accumulated in the top portion of the same so that the water may circulate freely at all times as is necessary for an efficient operation of the heating system.

Another important object of the invention is the provision of a relief valve with means adapted to automatically open the same every time a predetermined amount of air has accumulated in the radiator, said means being rendered inactive and permitting said relief valve to close as soon as the air has escaped from the radiator so that no water can escape through the relief valve.

Another object of the invention is the provision of a relief valve with a chamber containing a float which controls a movable valve, said chamber being in direct communication with the hot water space in the radiator and normally filled with a sufficient quantity of water to keep the valve in closed position; the water causing the float to move the valve positively into open position when the float, owing to a descending water level in said chamber caused by air accumulating in the same, should assume a predetermined low position in said chamber.

Numerous other objects and advantages of the invention will be apparent as it is better understood from the following description, which, taken in connection with the accompanying drawing, discloses a preferred embodiment thereof.

On the drawing,

Figure 1 is a perspective view of the upper portion of a radiator equipped with an air relief device embodying the present invention;

Fig. 2 is a plan view of the air relief device and shows its attachment to the air relief fitting of a radiator;

Fig. 3 shows in an enlarged scale a vertical longitudinal section of the relief device taken substantially on the line 3—3 of Fig. 2;

Fig. 4 view similar to Fig. 3, showing the movable parts of the device in another position; and Fig. 5 shows in an enlarged scale a horizontal section of the valve mechanism proper taken substantially on the line 5—5 of Fig. 3.

Referring now more particularly to the drawing, the casing 5 of the relief device containing the float chamber 6 consists of two tubular members 7 and 8. These tubular members are closed at one end and are connected with each other at their other ends by screw threads or the like to form a fluid-tight joint at 9. Preferably this two-part casing is connected at one end by means of a tubular nipple 10 with the customary air relief fitting 11 on the upper part of a radiator 12 of a hot water heating system. As shown in Fig. 1 the casing 5 is secured in such manner that it extends with its axis horizontally across the end of the radiator.

The float chamber 6 is in permanent communication with the hot water space in the radiator 12 and normally is filled with water up to the level indicated in Fig. 3 to keep the float 13 in a position in which the chamber 6 is closed against the atmosphere. The float 13 may consist of any member or material adapted to rise and fall with the water level in the chamber 6, such as cork, wood or, as shown in the drawing of an hermetically sealed sheet metal capsule of cylindrical shape.

On the upper end of one end wall of this float 13 a bracket 14 is secured. A link 15 is pivotally connected to the free end of this bracket and this link 15 in turn is pivotally connected to a forked extension 16 on one end of a collar 17 secured by a set screw 18, or the like, to a valve member 19 extending through the end wall 20 of the casing member 7 into the float chamber 6. For a given operating arc of the link or lever 15 a minimum diameter of casing 8 can be obtained by pivoting the float or actuating means 13 as above described.

The valve member 19 is tubular and contains a conventional tire valve 21 with its seat 22 normally held against its casing 21a having a packing 21b by a spring 23. The exterior of the valve member 19 is provided between its ends with a flange 24 which forms an abutment for the collar 17 and is adapted to rest against the inner face of the end wall 20 of the casing member 7. The outer end 25 of the valve member 19 is threaded and is screwed into a correspondingly threaded bore in the end wall 20 of the casing member 7.

The movable valve 21 is provided with an outwardly extending valve stem 26 projecting into the float chamber 6 and at its extreme end has an enlargement 28 adapted to be engaged by a hook-shaped member 29 controlled by the float 13. This hook-shaped member 29 consists of two integrally connected spaced parallel walls 30, each being provided at one end with a hook 31 arranged immediately behind the enlargement 28 on both sides of the valve stem 26. The link 15 extends between the walls 30 which are rigidly secured to said link 15 at 30'. The hook-shaped or channel member 29 functions as a guide for the valve stem 26, since the two hook portions 31 are positioned directly adjacent either side thereof and the side walls closely engage the link 15, as will be seen in Fig. 5.

The outer end of the bore 27 of the valve member 19 is threaded to accommodate the customary valve stem guiding means 32 which is integral with the valve casing 21a and is cut away at its outer end on two sides to form outlet apertures whose function will be later described, while a protective cap 33 is screwed upon the outer threads of the valve member 19.

The operation of this automatic air relief valve is as follows:

In the normally closed position of the valve 21 the movable parts assume the position as shown in Fig. 3. The float 13 is raised by the water in the float chamber 6, said water being supplied by the radiator and its level rises and falls with the water level in the radiator. In Fig. 3 the radiator 12 is substantially completely filled with water and under this condition the valve 21 is held in closed position by the action of the spring 23.

If for any reason air should accumulate in the radiator 12, the water level in the same and consequently in the float chamber 6 of the relief device is lowered, the float 13 descends with the water level and when the float assumes the position shown in Fig. 4 the link 15 connected with the float 13 and carrying the hook-shaped member 29 has been moved into a position in which the hooks 31 have engaged the enlargement 28 of the valve stem 26 and have moved the valve 21 against the action of the spring 23 toward the right into open position. The air accumulated in the radiator and the float chamber escapes now through the casing 21a and the side apertures in the guide means 32 of the valve 21 into the atmosphere, and while this takes place the water level in the radiator and float chamber 6 rises again, and when it has attained the level shown in Fig. 3 the float again assumes its normal position in which the valve 21 is pressed upon its seat 22 by the spring 23.

It will be noted that the valve 21 is closed before the water level reaches the higher level at which the valve casing 21a is arranged, so that no water can enter this casing and be discharged through the same. It will be obvious that when the enclosed water space (radiator) is to be drained, some of the water will also drain out of tubular members 7 and 8 through connector 10, causing float 13 to lower and open valve 21, to break the vacuum, and permit air to enter through valve 21 and allow water to flow out of the radiator. The automatic operation of the relief valve assures that the radiator is always kept substantially free of air so that the hot water therein may circulate freely, assuring uniform heat radiation and economical fuel consumption.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an automatic radiator air vent, a casing, a valve mounted in said casing and having a stem extending into the interior thereof, a float disposed within said casing, a link mounted for pivotal movement within said casing and pivotally connected to said float, and a channel shaped member interconnecting said link and said valve and whose side walls embrace said link to serve as guide means for movements of the valve.

2. In an automatic radiator air vent, a casing, a valve mounted in said casing and having a stem extending into the interior thereof with an enlarged end portion, a float disposed within said casing, a link mounted for pivotal movement within said casing and pivotally connected to said float, and a channel shaped member interconnecting said link and said valve and having a hook portion engaging the enlarged end portion of said valve stem and whose side walls embrace said link to serve as guide means for movements of the valve stem.

3. An automatic air valve for hot water radiation, comprising a casing adapted to be mounted on a radiator and communicate therewith horizontally, an air-venting valve mounted in said casing, spring means normally closing said valve, a float disposed within said casing, a link mounted for pivotal movement within said casing and pivotally connected to said float to provide true vertical positioning of said float at all times to minimize the necessary vertical dimension of said casing, and a channel-shaped hook member rigidly secured to said link and embracing a portion of said valve and said link to open the valve against the action of said spring means as said float moves downwardly and to serve as guide means for movements of the valve.

WILLIAM J. WOOLLEY.